United States Patent [19]

Campen

[11] Patent Number: 4,606,305

[45] Date of Patent: Aug. 19, 1986

[54] EXTERNAL MAGNET FLYWHEEL MOUNTING

[75] Inventor: Kenneth W. Campen, Kiel, Wis.

[73] Assignee: Tecumseh Products Company, Tecumseh, Mich.

[21] Appl. No.: 775,445

[22] Filed: Sep. 12, 1985

Related U.S. Application Data

[63] Continuation-in-part of Ser. No. 563,690, Dec. 20, 1983, Pat. No. 4,550,697.

[51] Int. Cl.[4] .............................................. F02P 1/00
[52] U.S. Cl. ........................... 123/149 D; 123/149 R; 310/153; 310/156
[58] Field of Search ...................... 123/149 D, 149 R; 310/70 R, 70 A, 152, 153, 156, 192

[56] References Cited

U.S. PATENT DOCUMENTS

| | | | |
|---|---|---|---|
| 3,747,649 | 7/1973 | Densow et al. | 123/149 D |
| 3,828,754 | 8/1974 | Carlsson | 123/149 D |
| 3,961,618 | 6/1976 | Swift | 123/149 D |
| 3,974,817 | 8/1976 | Henderson et al. | 123/149 D |
| 3,995,550 | 12/1976 | Carlsson | 123/149 D |
| 4,019,485 | 4/1977 | Carlsson | 123/149 D |
| 4,423,345 | 12/1983 | Willsson | 123/149 D |

Primary Examiner—Raymond A. Nelli
Attorney, Agent, or Firm—Albert L. Jeffers; Anthony Niewyk

[57] . ABSTRACT

A flywheel assembly for a small internal combustion engine including a permanent magnet structure secured to the flywheel near the outer periphery thereof and for cooperating with the ignition stator to induce spark creating voltages therein. The permanent magnet structure includes two pole shoes and a permanent magnet captured between shoulder portions of the pole shoes. A non-magnetic spacer plate includes two protuberances and is inserted between the flywheel and the magnet group consisting of the pole shoes and the permanent magnet. The protuberances cooperate with outer peripheral surfaces of the pole shoes. The magnet group is held accurately and rigidly in position by axially compressing a pair of rivets which pass through the flywheel, the plate and the magnet group, whereby the rivets are radially expanded to tightly fill the respective apertures through which they pass. The protuberances on the plate prevent the pole shoes from pivoting when the pole shoe outer surfaces are machined. The magnets are prevented from radial movement with respect to the axis of the flywheel by the recessed portions of the pole shoes.

18 Claims, 4 Drawing Figures

U.S. Patent  Aug. 19, 1986  4,606,305
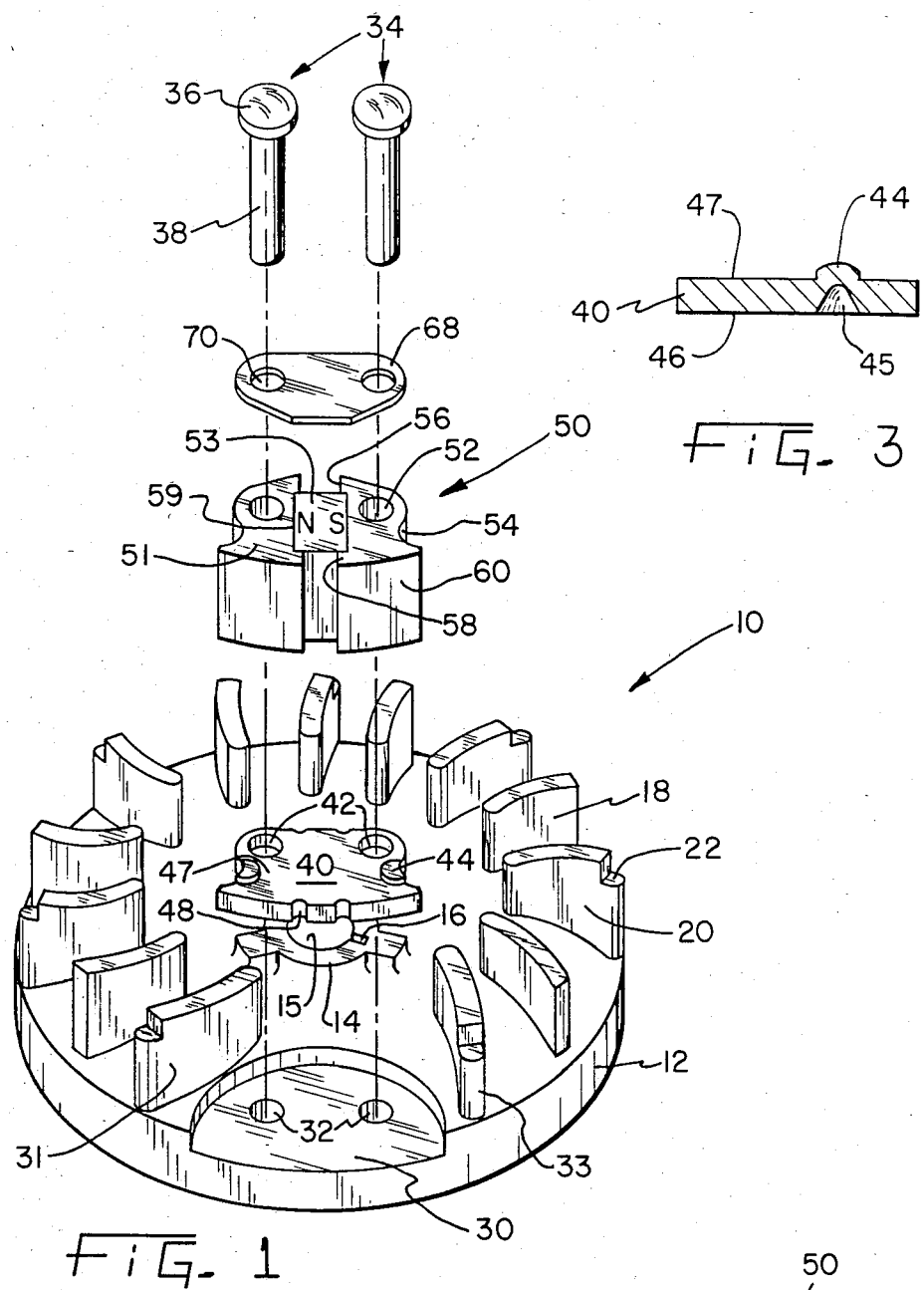
FIG. 1
FIG. 3
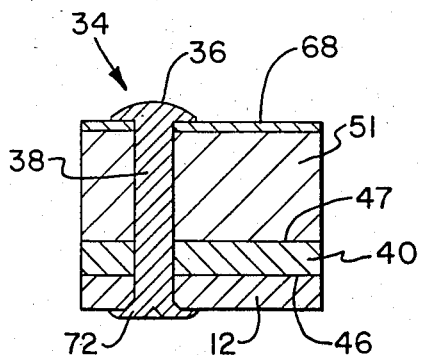
FIG. 2
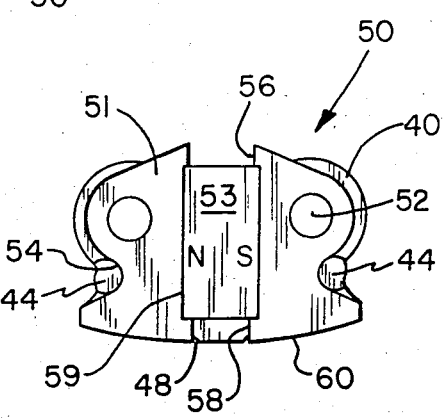
FIG. 4

EXTERNAL MAGNET FLYWHEEL MOUNTING

BACKGROUND OF THE INVENTION

This is a continuation-in-part of application Ser. No. 563,690 filed Dec. 20, 1983, now U.S. Pat. No. 4,550,697.

The present invention relates generally to flywheel structures for small internal combustion engines including permanent magnet structures rigidly secured thereto. More particularly the present invention relates to such structures wherein the magnet structure is secured near the outer periphery of the flywheel and comprises the moving portion of the engine ignition assembly for inducing spark creating voltages.

Ignition systems for small internal combustion engines employing permanent magnets which rotate with the engine flywheel and stator structures positioned either radially outwardly or radially inwardly of the magnet whereby the flux patterns therein are periodically changed by the passage of the magnet past the stator are old and well known in the internal combustion engine art. Such ignition systems frequently employ two or three stator legs in close proximity to the path of the magnet and may rely on a capacitor discharge technique or solid state triggering scheme to induce a high voltage in a secondary coil of an ignition transformer for ignition spark generating purposes. While forming no part of the present invention it is contemplated that the pair of magnet poles of the magnet group will sweep past an external E-shaped stator of an ignition system employing solid state techniques without mechanical breaker points of a type in current commercial use by applicant's assignee. However, it is noted that the techniques of the present invention are applicable to a wide variety of ignition systems, battery charging schemes, and other applications where it is desired to mount a permanent magnet on a ferro-magnetic body in a magnetically isolated fashion.

Many small internal combustion engines employ a flywheel fabricated of cast aluminum. A common technique for securing the magnet group in such non-magnetic flywheel structures is to form a magnet group receiving pocket within the aluminum casting and then to fix the magnet group within that pocket by means of a pair of roll pins. U.S. Pat. No. 4,179,634 has addressed the problem of mounting such a magnet group on a flywheel fabricated of either a non-magnetic or ferro-magnetic material and suggests a not altogether satisfactory solution to the magnetic flux short circuiting problem associated with a flywheel of a ferro-magnetic material. This patent teaches the use of a non-ferrous insert including a cavity for receiving the magnet group. The magnet group is fastened within the non-ferrous insert by means of the standard roll pin fastening technique. The non-ferrous pocket is in turn secured to the flywheel by means of screws. As there is always some clearance between the screws and non-threaded member through which those screws pass, the positioning of the non-ferrous pocket is necessarily somewhat inaccurate which in turn creates the problem of a variable air gap between the magnet structure secured to the flywheel and the fixed stator structure adjacent thereto. Also, typically the region occupied by the magnet group detracts from the remaining annular region of the flywheel frequently occupied by air circulating fins for engine cooling purposes. Thus the more substantial annular space occupied by the non-ferrous pocket in this patented arrangement detracts from the cooling of the engine. A still further drawback of this arrangement is the number of parts employed and the complexity of the assembly.

In the above referred to copending patent application a scheme for mounting a permanent magnet group into a flywheel is provided wherein an annular region of the flywheel receives a non-magnetic spacer or plate and wherein the placer is sandwiched between the flywheel and the magnet group by a pair of non-magnetic rivets which pass through the flywheel, the spacer and the magnet group. The magnet group is rigidly held in position by upsetting the rivets into axially compress and radially expand the rivet material, whereby the rivets tightly fill the respective apertures through which they pass. After the rivet expanding operation the flywheel is machined by means of a lathe turning operation to provide the proper clearances for the flywheel as it rotates and the magnet group passes the stator of the ignition structure. However, when a milling operation is substituted for the turning operation, tool loading is increased to the point where the magnet and pole shoes may pivot on the rivets, thus causing cocking of the pole shoe faces and resulting in flux leakage, an increased air gap and a resulting increase in reluctance, and loss of output flux. Additionally while the magnet in this structure was glued to the pole shoes to keep the magnet in place, when such magnet group structures warm up there is a possibility that the glue will not hold and that the magnet will slide radially inwardly toward the center of the flywheel and out of the space between the pole shoes.

SUMMARY OF THE INVENTION

The present invention overcomes the disadvantages of the above described prior art flywheel mountings of permanent magnet groups by providing an improved mounting arrangement therefor.

The invention provides, in one form thereof, a method for fastening a permanent magnet group to a ferro-magnetic flywheel body with substantial magnetic isolation of the magnet group from the body; the reduction of angular obstruction in the air cooling fin array of an engine flywheel by the permanent magnet group; the accurate and rigid positioning of the magnet group near the outer periphery of an engine flywheel; and the provision of a flywheel assembly for a small internal combustion engine with a permanent magnet structure supported near the outer periphery of a ferro-magnet flywheel.

In general a permanent magnet group is affixed to a ferro-magnetic body by providing a generally flat permanent magnet group receiving region near the periphery of the body to receive a first apertured flat plate of non-magnetic material. The magnet group is secured to the flywheel by rivets which pass through the magnet group plate and body. The rivets are preferably formed of a solid non-magnetic material and are axially compressed and radially expanded during the riveting process to tightly engage the ferro-magnetic body, the plate, and the magnet group.

Furthermore, in one form of the invention, a permanent magnet structure having flux transmitting pole shoes adjacent respective poles of a magnet is fastened to a ferro-magnetic engine flywheel with a non-magnetic spacer positioned between the magnet structure and flywheel and with two solid cylindrical fasteners of non-magnetic material extending through the magnet structure, spacer and flywheel in a radially expanded manner so as to tightly engage the respective elements and fix their respective positions. The spacer includes two upwardly extending staked portions or protuberances which engage with the outer peripheral surfaces of the pole shoes to prevent pivoting movement of the pole shoes in a plane perpendicular to the axis of the flywheel. The pole shoes include a pair of shoulder portions in their inwardly facing oppositely positioned peripheral surfaces whereby the magnet is captured by the pole shoes and prevented from radial movement inwardly toward the axis of the flywheel.

An advantage of the structure of the present invention is the provision of a very simple yet effective structure for rigidly fixing a magnet pole group to the outer periphery of a flywheel.

A further advantage of the structure according to the present invention is that short circuiting of magnetic flux is prevented by the use of a non-magnetic spacer located axially between the magnet group and the flywheel.

A still further advantage of the present invention is the affixing in an accurate preselected position of the magnet group by the use of the upstanding protuberances on a non-magnetic plate and by the radial expansion of the cylindrical fasteners in the apertures of the respective elements of the structure.

The invention comprises, in one form thereof, a flywheel assembly for a small internal combustion engine of the type supporting a permanent magnet structure near the flywheel outer periphery for cooperating with a fixed ignition assembly for inducing spark creating voltages in the ignition assembly as the magnet structure rotates past the ignition assembly. The flywheel assembly includes a ferro-magnetic flywheel and a permanent magnet structure with a permanent magnet and a pair of flux transmitting pole shoes arranged adjacent the respective poles of the permanent magnet. The poles of the magnet and the pole shoes are circumferentially arranged near the periphery of the flywheel. A substantially non-magnetic spacer is axially positioned intermediate the flywheel and the permanent magnet structure for reducing flux leakage between the pole shoes by way of the flywheel. The spacer includes a plurality of protuberances which extend toward the pole shoes. Each protuberance is in contact with an external peripheral surface of one of the pole shoes, whereby the pole shoes are prevented from pivoting movement in a plane perpendicular to the flywheel axis. A plurality of solid generally cylindrical fasteners of substantially non-magnetic material pass through apertures in the magnet structure, spacer, and flywheel. The fasteners are expanded radially in the apertures to tightly engage the magnet structure, spacer, and flywheel.

The invention, in one form thereof, further comprises a flywheel assembly for a small internal combustion engine of the type supporting a permanent magnet structure near the flywheel outer periphery for cooperating with a fixed ignition assembly and inducing spark creating voltages in the ignition assembly as the magnet structure rotates past the ignition assembly stator. The flywheel assembly includes a ferro-magnetic flywheel and a permanent magnet structure including a permanent magnet and a pair of flux transmitting pole shoes adjacent the respective poles of the permanent magnet. The poles of the magnet and the pole shoes are circumferentially arranged near the periphery of the flywheel. Each pole shoe includes a generally concave recessed portion in its outer peripheral surface circumferentially outward of the magnet. Each pole shoe further includes a pair of shoulder portions along its radial inner peripheral surface adjacent the permanent magnet and forms a recess therebetween. The magnet is disposed in the pole shoe recesses and is restrained thereby from radial movement with respect to the axis of the flywheel. A substantially non-magnetic spacer is actually positioned intermediate the flywheel and the permanent magnet structure for reducing flux leakage between the pole shoes by way of the flywheel. The spacer includes a plurality of protuberances which extend toward the pole shoes. Each protuberance cooperates with a respective pole shoe concave recessed surface portion whereby the pole shoes are restrained from pivoting movement in a plane perpendicular to the flywheel axis. A solid, generally cylindrical fastener of substantially non-magnetic material passes through the apertures in the magnet structure, spacer, and flywheel. The fastener is expanded radially in the apertures to tightly engage the magnet structure, spacer and flywheel.

It is an object of the present invention to provide an improved flywheel assembly including a permanent magnet structure near the periphery thereof. It is a further object of the present invention to provide a flywheel assembly including a permanent magnet group wherein the magnet group is fixed in place by the use of a pair of solid cylindrical rivets which are axially compressed and radially expanded to fill the apertures through which they pass thereby to tightly engage and fix the relative positions of the magnet structure.

A further object of the present invention is to provide a flywheel structure including a permanent magnet assembly secured thereto by solid cylindrical fasteners and including a non-magnetic spacer axially positioned between the flywheel and the permanent magnet structure, a permanent magnet which is retained in place by a pair of pole shoes whereby the magnet is restrained from radial movement with respect to the axis of the flywheel, and a pair of protuberances on the non-magnetic plate which engage the outer peripheral surfaces of the pole shoes to restrain the pole shoes from pivoting movements about the solid cylindrical fasteners.

BRIEF DESCRIPTION OF THE DRAWINGS

The above mentioned and other features and objects of this invention, and the manner of obtaining them will become more apparent and the invention itself will be better understood by reference to the following description of an embodiment of the invention taken in conjunction with the accompanying drawings, wherein:

FIG. 1 is an exploded perspective view of the flywheel assembly of the present invention;

FIG. 2 is a view in cross section of a portion of the flywheel assembly of FIG. 1 in its assembled position;

FIG. 3 is a view in cross section of the spacer of FIG. 1 including the staked portion.

FIG. 4 is a top plan view of the magnet group assembly and the spacer.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to the drawing FIGS. 1-4 the flywheel assembly 10 for the small internal combustion engine is seen to include an engine flywheel 12 formed partially or totally of a ferro-magnetic material such as cast iron, for example. The flywheel typically has a raised bushing portion 14 including a tapered central crankshaft receiving opening 15 containing a conventional keyway 16 for fastening the flywheel to an engine crankshaft for rotation therewith. Flywheel 12 also includes a plurality of air circulating fins 18 and 20 which, when the flywheel rotates about the axis of the crankshaft, tend to circulate air about the internal combustion engine for cooling purposes. As shown in FIG. 1 each of fins 20 includes a notched portion 22 at the outer periphery thereof. Notched fins 20 alternate with radially shortened unnotched fins 18 whereby every other fin includes a notched out portion 22. The notches are necessary to provide clearance of the fins with respect to other parts (not shown) of the structure. Flywheel cooling fins 18 and 20 pass the ignition module at a high rate of speed and thereby generate sound at a frequency related to the rotational speed of the flywheel and the number of fins 18 and 20. By alternating radially shortened, unnotched fins 18 and notched fins 20, rather than using a single type of fin, the sound frequencies generated by the structure are lowered to an acceptable pitch, thereby eliminating an undesirable whine. Without radially shortened fins the notched flywheel fins generate a high pitched whine at a frequency in the range of 1,000 to 1,100 Hertz when the engine is running at approximately 3600 rpm. By cutting back fins 18 as shown and by alternating fins 18 with fins 20 the noise generated by the flywheel is split into two lower frequency ranges whereby the sounds are mixed in with the other engine noise and are therefore less objectionable. Thus the overall sound level generated by the flywheel is not reduced, but the sound frequencies generated by the flywheel are reduced to acceptable frequency ranges.

Fins 18 and 20 form an annular fin structure near the outer periphery of flywheel 12 with that annular fin structure interrupted by a flat region 30 having apertures 32 therein for receiving solid non-magnetic rivets 34. It should be noted that the two fins 31 and 33 located on either side of region 30 are thicker than the remaining fins 18 and 20. This added thickness will compensate for the weight lost by eliminating the fins in the space of flat region 30. The added weight of fins 31 and 33 will therefore balance flywheel assembly 10. Typically these rivets have preformed heads 36 and are of a relatively soft non-magnetic material which is easily deformed such as for instance aluminum. Rivets 34 also include shank portions 38 which are received in apertures 32 of the flat region 30. Flat region 30 is adapted to receive a generally flat non-magnetic spacer or plate 40, which is formed of aluminum or zinc material and which includes rivet receiving openings 42 of like size, shape and spacing as openings 32 in region 30.

As best illustrated in FIG. 3, plate 40 also includes a pair of staked up portions or protuberances 44 which are formed by means of a punch or a similar type of tool whereby indentations 45 are generated in the bottom surface 46 of plate 40 and whereby protuberances 44 will be formed in the upward direction on the top surface 47 of plate 40. As best seen in FIGS. 1 and 4, protuberances 44 are generally circular in shape for purposes further explained hereinafter. It should be noted that two thin stacked plates could be substituted for relatively thick plate 40. The top plate would then have protuberances 44 formed therein.

Magnet group 50 for the ignition system includes a pair of pole shoes 51 positioned at the opposite poles of permanent magnet 53. Pole shoes 51 also include like rivet receiving apertures 52 similar to apertures 32 and 42 respectively in flywheel 12 and spacer 40. The outer peripheral surfaces of pole shoes 51 include curved portions 54 for cooperating with circular protuberances 44 as further explained hereinafter. Pole shoes 51 also include shoulder portions 56 and 58 in their radial inner peripheral surfaces which form recessed portions 59 in the inner peripheral inner surfaces of pole shoes 51. Recessed portions 59 are oriented in opposite and facing relationship thereby form a rectangular space for receiving permanent magnet 53. Pole shoes 51 also include peripheral portions 60 which are located adjacent the periphery of the flywheel and which pass by the stator of the ignition system as flywheel 12 rotates. It should be noted that pole shoes 51 may be manufactured from sintered metal whereby the pole shoes need a minimum of machining operations.

A further non-magnetic plate 68 is formed of material such as aluminum, zinc or the like and includes a set of rivet receiving apertures 70. In a preferred embodiment plate 68 overlays magnet group 50 and thereby prevents axial upward movement of magnet 53.

The flywheel and magnet group are assembled by first placing plate or spacer 40 on flat annular region 30. The magnet group 50 including pole shoes 51 and permanent magnet 53 are then placed on plate 40 with apertures 52 of pole shoes 51 in alignment with apertures 42 and apertures 32 of plate 40 and flywheel 12 respectively. The rectangular space between opposed recessed portions 59 of pole shoes 51 receives permanent magnet 53. Permanent magnet 53 is oriented to have the poles thereof circumferentially arranged on flywheel 12 as shown by the letter "N" for north pole and "S" for south pole in FIG. 1. It should be understood that the magnet may be inverted whereby the north and south poles will be interchanged. It should also be understood that, for ease of assembly, magnet 53 may be magnetized after assembly of the flywheel magnet group to the flywheel. As best seen in FIG. 4 the concave portions 54 of pole shoes 51 match the circular peripheries of protuberances 44 whereby protuberances 44 contact these contoured concave regions. Protuberances 44 therefore prevent pole shoes 51 from pivoting about rivets 34 during the milling operation which is performed on pole shoes 51 to shape surfaces 60 after fastening of the magnet group to the flywheel.

Plate 68 is now placed on top of magnet group 50 with apertures 70 in alignment with like apertures 52, 42 and 32. Solid rivets 34 are passed through the aligned apertures and are then upset as by axial compression to induce a correlative lateral expansion in the radial direction of rivet shanks 38 to tightly fill each of the aligned apertures as best shown in FIG. 2. Thus rivets 34 have a second head 72 formed thereon by the upsetting process and further are expanded radially inside the aligned apertures by this upsetting process to fill the respective apertures and provide a press fit between the several parts and the rivets. Thus it will be seen that the flux transmitting pole shoes 51 are positioned at the periphery of the flywheel in a very secure manner by rivets 34 and by protuberances 44. Each pole shoe is secured at two locations by means of one of the rivets and one of the protuberances. The sole means of interconnecting flywheel 12, permanent magnet structure 50, spacer 40 and overlying flat plate 68 is by rivets 34. After rivets 34 are secured in place, outer surfaces 60 of pole shoes 51 are machined such as by a milling operation to insure the proper air gap between the ignition stator and pole shoes 51 as pole shoes 51 rotate with flywheel 12.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A flywheel assembly for a small internal combustion engine of the type supporting a permanent magnet structure near the flywheel outer periphery for cooperating with a fixed ignition assembly and inducing spark creating voltages in the ignition assembly as the magnet structure rotates past the ignition assembly and comprising:

a ferro-magnetic flywheel;

a permanent magnet structure including a permanent magnet and a pair of flux transmitting pole shoes adjacent the respective poles of the permanent magnet, the poles of said magnet and the pole shoes circumferentially arranged near the periphery of said flywheel, each said pole shoe including a generally concave recessed portion in its outer peripheral surface circumferentially outwardly of said magnet, each said pole shoe further including a pair of shoulder portions along its radial inner peripheral surface adjacent said permanent magnet and forming a recess between said shoulder portions, said magnet disposed in said pole shoe recesses and restrained thereby from radial movement with respect to the axis of said flywheel;

a substantially non-magnetic spacer axially positioned intermediate the flywheel and the permanent magnet structure for reducing flux leakage between the pole shoes by way of the flywheel, said spacer including a plurality of protuberances, said protuberances extending toward said pole shoes, each said protuberance cooperating with a respective said pole shoe concave recessed surface portion whereby said pole shoes are restrained from pivoting movement in a plane perpendicular to said flywheel axis; and a solid generally cylindrical fastener of substantially non-magnetic material passing through apertures in the magnet structure, spacer and flywheel, said fastener expanded radially in said apertures to tightly engage the magnet structure, spacer and flywheel.

2. The flywheel assembly of claim 1 further comprising a second solid generally cylindrical fastener of non-magnetic material passing through apertures in the magnet structure, spacer and flywheel, said fastener expanded radially in said apertures to tightly engage and fix the relative positions of the magnet structure, spacer and flywheel.

3. The flywheel assembly of claim 2 wherein the solid fastener and second solid fastener pass through respective apertures in respective pole shoes of the permanent magnet structure.

4. The flywheel assembly of claim 3 further comprising a flat plate of substantially non-magnetic material overlying the magnet structure with the magnet structure sandwiched between the flat plate and the spacer, and with the fastener and second fastener passing additionally through the flat plate.

5. The flywheel assembly of claim 4 wherein the spacer, flat plate and solid fasteners are fabricated of an aluminum material.

6. The flywheel assembly of claim 1 wherein the engine flywheel is fabricated of a cast iron material and includes fins for circulating air to cool the engine, the fins being positioned in an annular region near the outer periphery of the flywheel shared by the magnet structure.

7. The flywheel assembly of claim 6 wherein the fins located on both sides of the magnet structure are thicker than the remaining fins.

8. The flywheel assembly of claim 1 wherein the pole shoes are fabricated of sintered metal.

9. A flywheel assembly for a small internal combustion engine of the type supporting a permanent magnet structure near the flywheel outer periphery for cooperating with a fixed ignition assembly for inducing spark creating voltages in the ignition assembly as the magnet structure rotates past the ignition assembly and comprising:

a ferro-magnetic flywheel;

a permanent magnet structure including a permanent magnet and a pair of flux transmitting pole shoes adjacent the respective poles of the permanent magnet, the poles of said magnet and the pole shoes circumferentially arranged near the periphery of said flywheel;

a substantially non-magnetic spacer axially positioned intermediate the flywheel and the permanent magnet structure for reducing flux leakage between the pole shoes by way of the flywheel, said spacer including a plurality of protuberances, said protuberances extending toward said pole shoes, each said protuberance in contact with an external periphery surface of one of said pole shoes, whereby said pole shoes are prevented from pivoting movement in a plane perpendicular to said flywheel axis; and a plurality of solid, generally cylindrical fasteners of substantially non-magnetic material passing through apertures in the magnet structure, spacer, and flywheel, said fasteners expanded radially in said apertures to tightly engage the magnet structure, spacer and flywheel.

10. The flywheel assembly of claim 9 wherein each said pole shoes includes a generally concave recessed portion in its outer peripheral surface radially outwardly of said magnet.

11. The flywheel assembly of claim 9 wherein each said pole shoes includes a pair of shoulder portions along its radial inner surface adjacent said permanent magnet and forming a recess therebetween, said magnet disposed in said pole shoe recesses and restrained thereby from radial movement with respect to the axis of said flywheel.

12. The flywheel assembly of claim 9 further comprising a flat plate of substantially non-magnetic material overlying the magnet structure with the magnet structure sandwiched between the flat plate and the spacer, said fasteners passing additionally through said flat plate.

13. The flywheel assembly of claim 9 wherein the spacer, flat plate and solid fasteners are fabricated of an aluminum material.

14. The flywheel assembly of claim 9 wherein the engine flywheel is fabricated of cast iron material and includes fins for circulating air to cool the engine, said fins being positioned at an annular region near the outer periphery of the flywheel shared by the magnet structure.

15. The flywheel assembly of claim 14 wherein the two fins located on both respective sides of the magnet structure are heavier than the remaining fins.

16. The flywheel assembly of claim 9 wherein the flywheel includes a generally flat magnet structure receiving region communicating with the flywheel outer periphery, the spacer comprising a flat plate sandwiched between said region and the magnet structure.

17. The flywheel assembly of claim 9 wherein the spacer and flat plate are fabricated of zinc.

18. The flywheel magnet structure of claim 9 wherein said pole shoes are fabricated of sintered metal.

* * * * *